United States Patent
Santa Cruz et al.

[11] Patent Number: 6,032,907
[45] Date of Patent: Mar. 7, 2000

[54] MULTIPURPOSE FASTENER

[76] Inventors: Cathy D. Santa Cruz, 401 Canyon Way, #43, Sparks, Nev. 89434; Wayne R. Sandstrom, P.O. Box 549, Wadsworth, Nev. 89442

[21] Appl. No.: 09/039,137

[22] Filed: Mar. 13, 1998

[51] Int. Cl.[7] .................................................. E21F 17/02
[52] U.S. Cl. ............................ 248/60; 248/71; 248/74.3; 174/135
[58] Field of Search ................................. 248/58, 60, 62, 248/63, 71, 74.2, 74.3, 317, 339, 302, 303, 304, 201; 74/135, 136, 43; 294/74

[56] References Cited

U.S. PATENT DOCUMENTS

| | | | |
|---|---|---|---|
| 1,931,808 | 10/1933 | Andersen | 248/61 X |
| 1,959,985 | 5/1934 | Moll | 248/61 X |
| 2,423,455 | 7/1947 | Larson | 248/71 |
| 2,900,155 | 8/1959 | Cameron | 248/71 |
| 3,284,038 | 11/1966 | Udry | 248/74.3 |
| 3,979,094 | 9/1976 | DeWitt | 248/74.3 |
| 4,254,930 | 3/1981 | Warren | 248/542 |
| 4,856,836 | 8/1989 | Delphin | 294/74 |
| 5,303,885 | 4/1994 | Wade | 248/62 |
| 5,364,053 | 11/1994 | Rodgers | 248/302 |

*Primary Examiner*—Ramon O. Ramirez
*Assistant Examiner*—Gwendolyn Baxter

[57] ABSTRACT

A multipurpose fastener which may be used to support an object from a support structure. The fastener is formed from one continuous wire which is substantially bent over lengthwise upon itself, thus forming a looped end which has an open and closed position. No additional apparatus is necessary for installation, and in a second embodiment, the fastener is combined with insulation which provides unusual results.

11 Claims, 5 Drawing Sheets

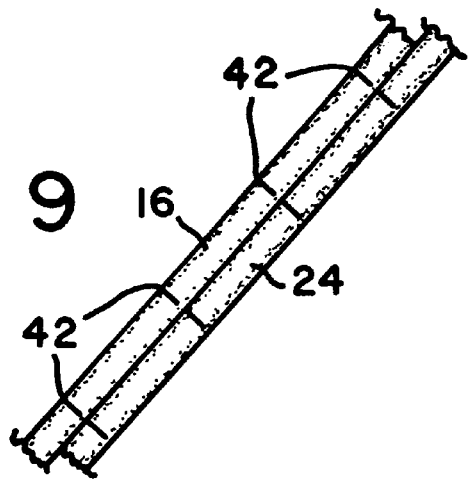
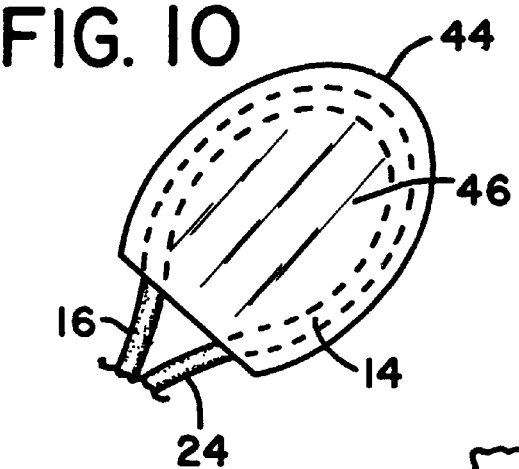
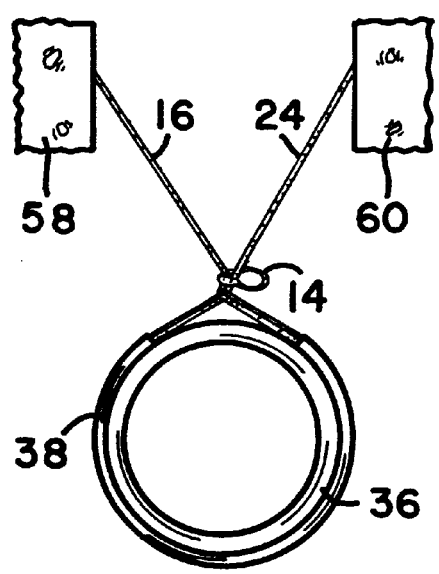

MULTIPURPOSE FASTENER

FIELD OF THE INVENTION

This invention relates to fasteners in general, but more particularly pertains to a fastener, which in one embodiment comprises one elongated member only, while in a second embodiment the member is combined with insulation, and a method of use is disclosed.

BACKGROUND OF THE INVENTION

In the past, many different types of fasteners have been taught within the prior art. However, most fasteners are designed for a specific use and could not be used for multiple purposes, as can the present invention.

For example, U.S. Pat. Nos. 5,364,053, 4,979,715 and 3,859,770, are each specifically designed for supporting an acoustical ceiling from an overhead structure. They are each limited in strength, each require additional apparatus, such as a bracket or the like, and none are combined with insulation, as taught by the present invention.

Further examples are taught within U.S. Pat. Nos. 953, 951 and 5,554,833, each of which are specifically designed for supporting a cable or conduit from a support structure, and again no suggestion or reference is made to the use of an elongated member, such as a wire, in combination with insulation.

Therefore, nowhere in the prior art did the applicants find a fastener which can be made from a wire, which when combined with insulation, provides a multipurpose fastener having unusual results, such as taught by the present invention.

SUMMARY OF THE INVENTION

The present invention is substantially a multipurpose fastener which can be used to suspend, support and attach an object to a support structure of choice. Therefore, the present fastener is most versatile, as it can be used to support substantially any object of choice. For example, the present fastener may be used to suspend or support plumbing from any suitable support structure. Or the present fastener may be used to support conduit. Or still further, the present fastener can be used to support a hydronic radiant heat pipe, or the like.

Therefore, the present fastener is not limited to one specific use, but can be used to substantially provide support or suspend any object of choice from substantially any support structure of choice.

One embodiment for the fastener can be easily formed from one continuous wire, while in a second embodiment a portion of the wire is positioned within an insulating removable member. Also, within a third embodiment a portion of the wire may be positioned within two insulating removable members.

However, each embodiment provides different results and distinct advantages as will later be seen.

It is therefore an object of the present invention to provide a multipurpose fastener which can be used to support or suspend, any object of choice, such as a pipe from substantially any suitable support structure of choice, such as an overhead support beam.

It is a further object of the present invention to provide a multipurpose fastener which is formed from one continuous wire.

It is a further object of the present invention to provide a multipurpose fastener which includes at least one continuous wire in combination with at least one insulating removable member.

It is a further object of the present invention to provide a multipurpose fastener which includes at least one continuous wire in combination with at least two insulating removable members.

Furthermore, it is another object of the present invention to provide a multipurpose fastener which can be formed from substantially any suitable length or gauge of wire of choice, such as 12 gauge.

Yet another object of the present invention is to provide a multipurpose fastener which includes an insulating removable member which is made from substantially any suitable non-metallic material of choice, such as rubber, neoprene, flexible plastic, etc. However, the applicants have found the "DEKORON TUBING" is most efficient, and also this material is classified as being approved from flame and smoke.

Still a further object of the present invention is to provide a multipurpose fastener having an insulating removable member which is of any suitable length of choice and includes an inside diameter of substantially any suitable size of choice.

Yet another object of the present invention is to provide a multipurpose fastener which is formed from a wire and an insulating member, with the insulating member having any suitable means to be removably attached to the fastener. For example, the insulating member may be slidably engaged around the outside circumference of the wire, or any other suitable removable attachment means may be used.

Still a further object of the present invention is to provide a multipurpose fastener which has inherent advantageous characteristics, such as the fastener provides additional tensile strength. In fact, when one fastener is used, the tensile strength is approximately 600 lb. Also, the present fastener reduces stress points on the object being fastened which is very advantageous.

Further unique characteristics are provided when the fastener is combined with insulation, such as reduced stress points on the object being supported. This unique combination further provides dielectric separation, sound attenuation, improved seismic bracing, reduced loading, reduced thermal transfer, etc.

Another object of the present invention is to provide a multipurpose fastener which is completely adjustable and can support substantially any size object of choice.

Still a further object of the present invention is to provide a multipurpose fastener which includes suitable attachment means for fixedly attaching the free ends of the fastener to a support structure.

Yet another object of the present invention is to provide a fastener which is easy to install, without the use of typical installation tools. For example, when a workman is installing plumbing such as a pipe, it is necessary when using all of the known prior art pipe fasteners, that a riser clamp is essential. Thus the present invention eliminates the need for a typical riser clamp, which is most advantageous.

It is a further object of the present invention to provide a fastener which can be pre-formed at the point of manufacture, or the fastener can be manually formed at the point of installation, depending on engineering and user choice.

Still a further object of the present invention is to provide a fastener which when installed is pleasing to the eye, thus the present fastener also provides aesthetic characteristics, not found in the prior art.

Yet another object of the present invention is to provide a fastener which is most economical to manufacture and market.

Also, a further object of the present invention is to provide a fastener which is attachable to an identification tag, or the like. Furthermore, the tag may include indicia thereon, and the tag provides a grippable handle which allows a user to grip the tag and bend a portion of the fastener into a position of choice.

Still a further object of the present invention is to provide a fastener which requires very little time to install.

Another object of the present invention is to provide a method of use for the present fastener which is not taught within the prior art.

Other objects and advantages will be seen when taken into consideration with following specification and drawings.

BRIEF DESCRIPTION OF THE DRAWINGS

FIG. 9 is substantially a partial view of the present fastener having measurements.

FIG. 10 is substantially a top view of a rubber sleeve.

FIG. 11 is substantially a plan view for the present invention.

DETAILED DESCRIPTION OF THE DRAWINGS

Referring now in detail to the drawings wherein like characters refer to like elements throughout the various views.

As shown in FIGS. 1–3 and 7, (arrow 10) represents substantially an overview of the present invention, which is a multipurpose support device useable for substantially supporting any object of choice, from any suitable support structure of choice.

Figure 2:
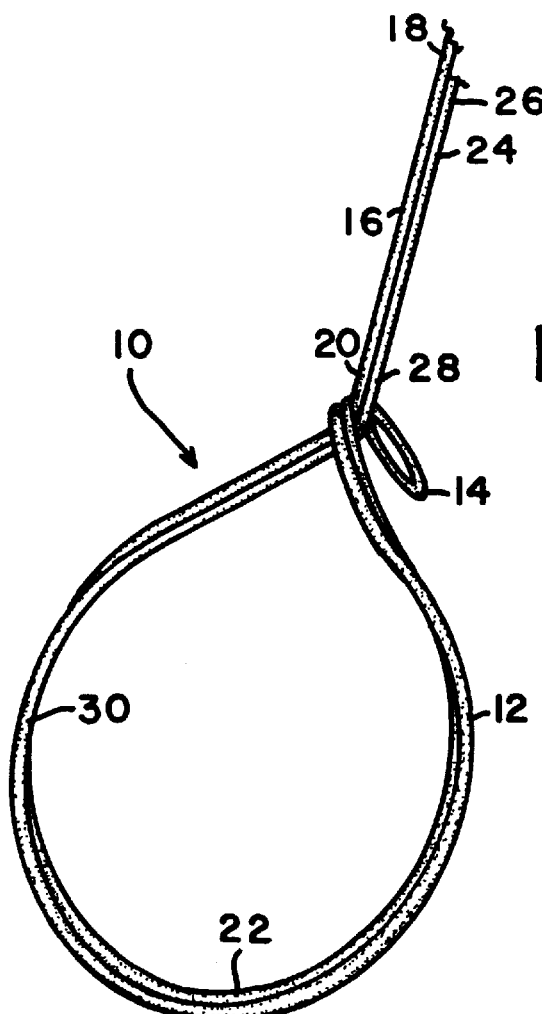
FIG. 2 is substantially a perspective view of a second embodiment for the present invention.
Figure 6:
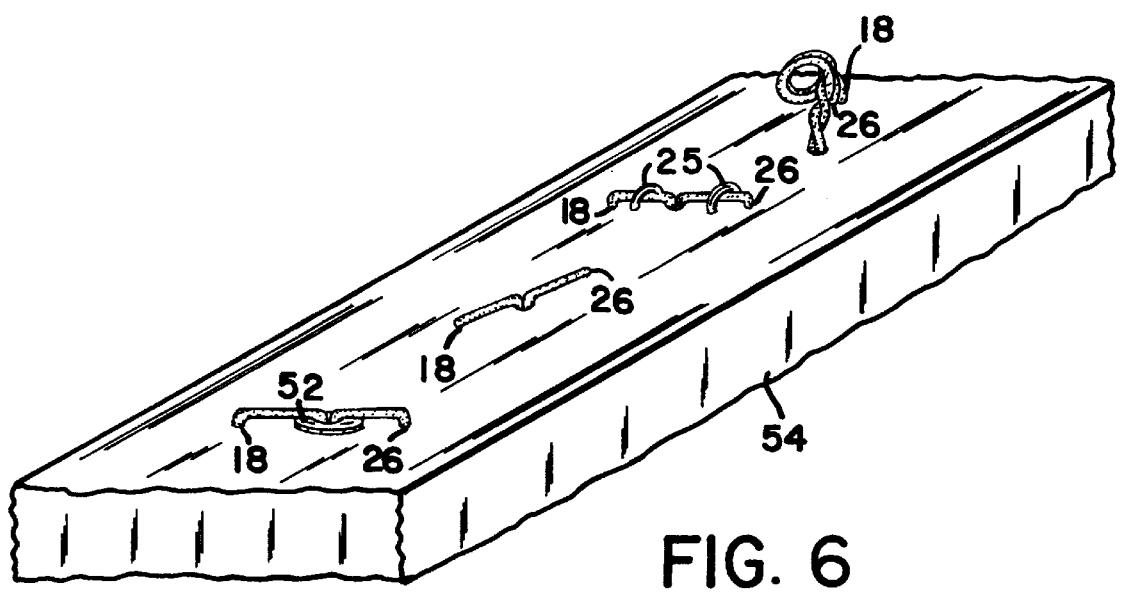
FIG. 6 is substantially a perspective plan view for attaching the present fastener to a support structure.

Referring now to FIG. 2, which is substantially a perspective view of a simplified embodiment for the present invention, however, this is not the preferred embodiment. The device comprising an elongated member (12) which may be made from substantially any suitable material of choice, such as metal, stainless steel, or the like. Member (12) is folded over lengthwise at least once upon itself, thus forming substantially a looped end (14). Member 12 further forming a first integral leg (16) having a first free end (18), a first section (20) and a second section (22). Member (12) further forming a second integral leg (24) having a first free end (26), a first section (28) and a second section (30) and each leg (16 & 24) being substantially aligned side-by-side. It is to be noted that the second section (22) of the first leg (16) is substantially bent to form substantially a first circle and the second section (30) of the second leg (24) is also bent to form substantially a second circle, and each circle being substantially aligned side-by-side. It is to be further noted that the first section (20) of the first leg (16) extends substantially upward from the first circle while the first section (28) of the second leg (24) extends substantially upward from the second circle. Furthermore, the looped end (14) is formed into substantially a hook-shape so as to be removably attached at a location of choice to each first section (20 & 28) simultaneously. Referring now to ends (18 & 26) each of which are removably attachable to a support structure by any suitable attachment means of engineering or user choice as seen in FIG. 6.

It will now be seen when an object, such as a pipe or the like, is inserted within each circle, and the looped end (14) is adjustably attached, the object is held and supported in a secure manner.

Figure 1:
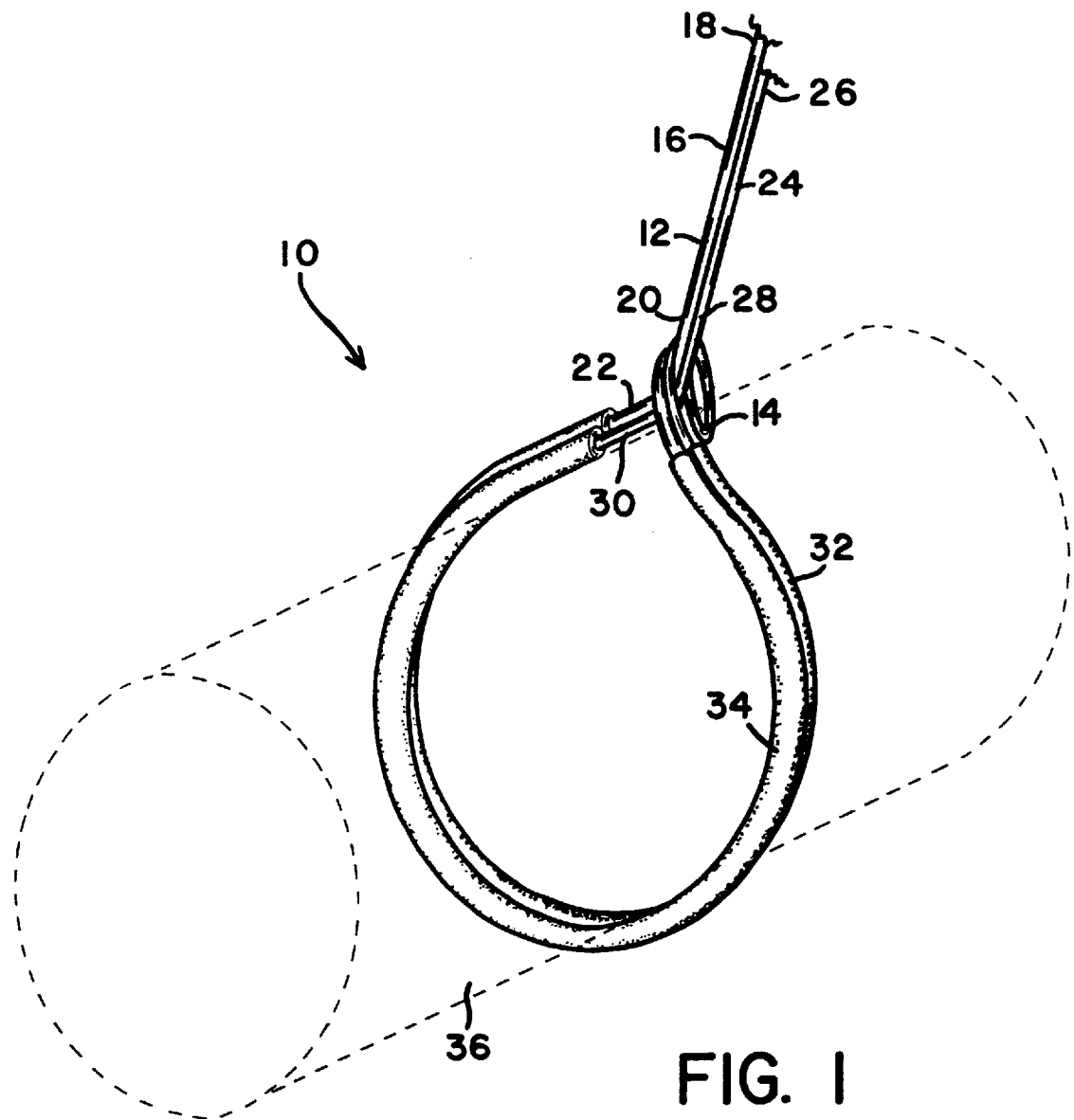
FIG. 1 is substantially a perspective view of the preferred embodiment for the present invention.

Referring now to the preferred embodiment as depicted in FIG. 1, wherein member (12) further includes the second section (22) of the first leg (16) being slidably engaged within a first elongated insulating member (32), and the second section (30) of the second leg (24) being slidably engaged within a second elongated insulating member (34), and the looped end (14) is substantially exposed. Also, the second section (22) of the first leg (16) and the first insulating member (32) are each bent to form substantially a first circle, and the second section (30) of the second leg (24) and the second insulating member (34) are each bent to form substantially a second circle, with each circle being substantially aligned side-by-side. It is to be noted that this unique combination, namely the fastener (arrow 10) and insulating members (32 & 34), provide most unusual results. For example, if the fastener (arrow 10) is used to support an object such as a pipe (36), the fastener (arrow 10) provides reduced stress points which would normally be encountered, and dielectric separation, sound attenuation, improved seismic connection, reduced point loading, reduced thermal transfer, etc., each of which are most beneficial. Furthermore, if so desired, each of the insulating members (32 & 34) may be color coded. For example, if the pipe (36) carries hot water, the insulating members (32 & 34) could be colored red for heat. Or if the pipe (36) carries cold water, the insulation members (32 & 34) could be colored blue for cold, or the like.

Figure 3:
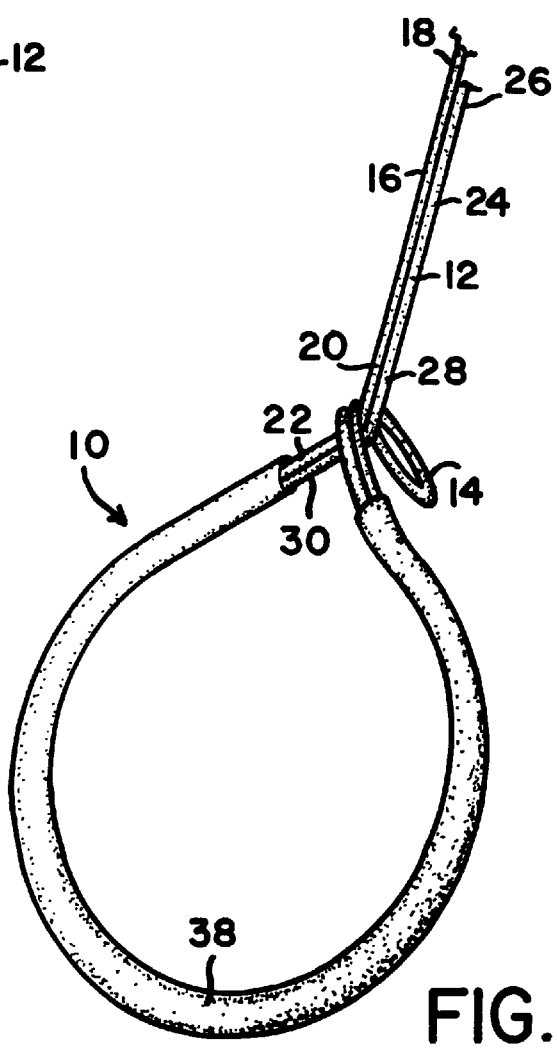
FIG. 3 is substantially a perspective view of a third embodiment for the present invention.

Referring now to FIG. 3, which substantially represents a third embodiment for the present fastener, wherein we show only one insulating elongated member (38) which is of a shape and size to slidably partially retain both legs (16 & 24) therein. Again, it is to be noted this embodiment also provides the unique advantages as described above.

Figure 7:
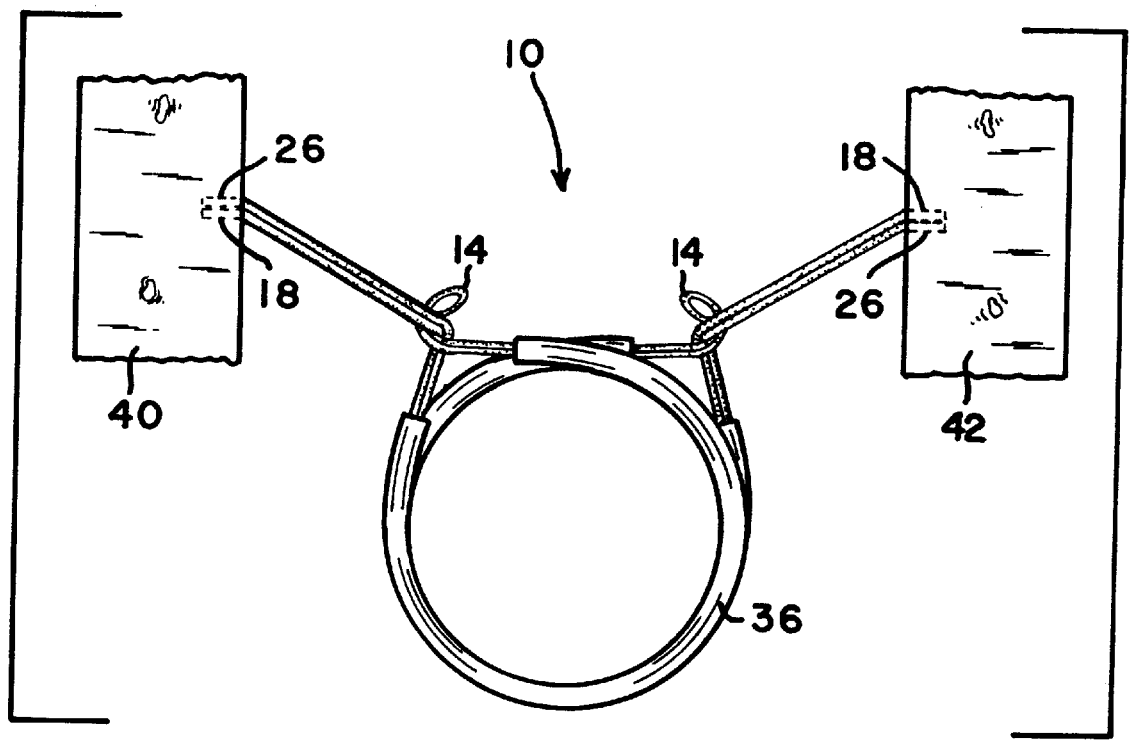
FIG. 7 is substantially a plan view showing two fasteners in combination.

Referring now to FIG. 7 wherein we show substantially a plan view for using two fasteners (arrow 10) in combination to support pipe (36) from a first support structure (40) and a second support structure (42). This allows a workman to install the fasteners from not only an overhead support structure, but from various support structures which may be located at various angles from the object to be supported. It is to be noted that any suitable support structure may be used, such as an overhead support beam made of wood or the like.

It is to be also noted that the present fastener (arrow 10) is completely adjustable in height, and the diameter of the circles may be adjusted to fit substantially any sized pipe of choice.

Referring now to FIG. 9 which exemplifies, if so desired, either the first leg (16) or the second leg (24), or both, may include indicia (42) thereon at a location of engineering choice, which indicates various measurements, or the like, of engineering choice thereon. Whereby, a workman can measure the distance between the object to be supported and the support structure, so as to ensure that the object to be supported is positioned substantially at the desired location.

Referring now to FIG. 10, wherein we show substantially a sleeve (44) having a cavity (46) therein, which is of a shape and size to slidably receive and retain the looped end (14) therein. It is to be noted the sleeve (44) can be made from substantially any suitable material of engineering choice, such as rubber, plastic, or the like, or if so desired sleeve (44) may be formed by dipping looped end (14) into a plastic coating, or the like. Furthermore, sleeve (44) not only provides esthetic qualities as it is pleasing to the eye, but it is also a gripping member which allows a workman to easily bend the looped end (14) by manually manipulating sleeve (44) until the desired shape is achieved.

Referring now to FIG. 11 wherein we show the first leg (16) and the second leg (24) being attached to different support structures (58 & 60). Whereby, fastener (arrow 10) can be easily attached to different support structures which are located at various angles from the object to be supported.

Figure 4:
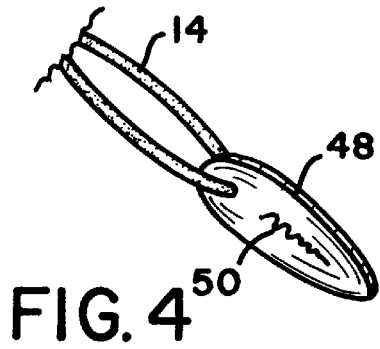
FIG. 4 is substantially a perspective view of an identification tag.

Referring now to FIG. 4, wherein we show the looped end (14) being removably attached by any suitable attachment means of engineering choice to an identification tag (48) having indicia (50) thereon which may be used to identify the fastener by product name, or the like. Furthermore, tag (48) may be color coded if so desired. Still further, tag (48) may also perform as a grippable handle which allows a workman to easily bend the looped end (14) by manually manipulating tag (48) until the desired shape is achieved.

Figure 5:
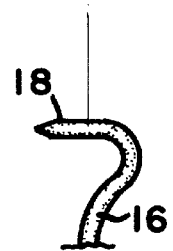
FIG. 5 is substantially a side view of one free end of the present fastener.

Referring now to FIGS. 5 & 6, wherein we show various attachment means for removably or fixedly attaching the first end (18) of first leg (16) and the second end (26) of the second leg (24) to a support structure. It is to be noted that any suitable attachment means may be used according to user or engineering choice. For example, the ends (18 & 26) may be attached by inserting each end into and through a washer (52), then bending the end portions over and substantially nailing the end portions into the support structure (54), as shown in FIG. 6. Yet another means to attach the ends (18 & 26) to the support structure (54) is to simply bend the ends (18 & 26) over and then nailing in place until substantially flush with support member (54). Still another attachment means may include the ends (18 & 26) being bent over and secured in placed by U-shaped nails (25), or the like. Yet another attachment means is to simply tie the ends (18 & 26). Or if preferred, the ends (18 & 26) may be formed into the shape of a nail, as shown in FIG. 5, which may then be hammered into place.

Figure 8:
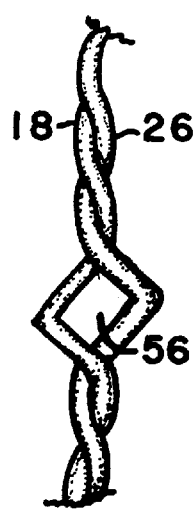
FIG. 8 is substantially a partial view of the fastener when twisted.

Referring now to FIG. 8 wherein we have shown legs (18 & 26) being substantially twisted together forming an opening (56) which allows a workman to adjust the length of fastener (arrow 10) by inserting a tool there through, such as a scratch-all tool, or the like, and manually adjusting until the desired length is achieved.

It is to be noted that fastener (arrow 10) may be pre-formed at the point of manufacture, or the fastener may be manually formed at the point of installation. If the fastener (arrow 10) is pre-formed at the point of manufacture, the looped end (14) assumes a closed snapped position when the looped end (14) is attached to substantially each first section (20 & 28) simultaneously, thus, looped end (14) can be easily snapped into its closed position, and when the looped end is unsnapped, the looped end (14) assumes its open unsnapped position.

It is to be further noted that we also provide a method for installing the fastener including the following steps of:

a. determining the desired location for the object to be supported;
b. determining the proper location for positioning fastener (arrow 10);
c. attaching the first end (18) of the first leg (16) to the support structure (40) at the desired location;
d. attaching the first end (26) of the second leg (24) to the support structure (40) at the desired location;
e. unsnapping looped end (14) into its open position;
f. positioning the object to be supported within the circles (sections 22 & 30) which are formed within the fastener (arrow 10);
g. snapping looped end (14) into its closed position;
whereby;
fastener (arrow 10) and the support structure (40) cooperate together and support the object therefrom, in a secure manner.

It is to be noted that if the fastener (arrow 10) is used for seismic restraint, the looped end (14) can be wrapped multiple times around the first sections (20 & 28) for additional strength. Thereafter, additional support means (not shown), such as multiple wires or the like, may be attached to the looped end (14) and secured to the support member. Thus, the fastener (arrow 10) and the object to be supported are secured in place, whereby, substantially all lateral or horizontal movement is eliminated.

It will now be seen we have herein provided a multipurpose fastener which can be used to support or suspend, any object of choice, such as a pipe from substantially any suitable support structure of choice, such as an overhead support beam.

It will also be seen we have herein provided a multipurpose fastener which may be formed from one continuous wire.

It will further be seen we have herein provided a multi-purpose fastener which includes at least one continuous wire in combination with at least one insulating removable member.

It will further be seen we have herein provided a multi-purpose fastener which includes at least one continuous wire in combination with at least two insulating removable members.

It will also be seen we have herein provided a multipurpose fastener which can be formed from substantially any suitable length or gauge of wire of choice, such as the wire may be 6 feet long and made from 12 gauge stainless steel, or the like.

It will also be seen we have herein taught a fastener which provides unique advantageous characteristics, such as reduced stress points on the object being supported, dielectric separation, sound attenuation, improved seismic bracing, reduced loading, reduced thermal transfer, etc.

It is to be noted that the present fastener further allows the ends thereof, to be attached in a manner which allows the ends to be substantially flush with the surface of the support structure. This is an important feature, as this allows a workman to install sheet rock, or the like, directly on top of the structure and ends of the fastener, unlike the known prior art.

It will further be seen we have herein provided a multi-purpose fastener which is completely adjustable and can support substantially any size object of choice.

It will also be seen we have herein provided a multipurpose fastener which includes suitable attachment means for fixedly attaching the free ends of the fastener to a support structure, such as the free ends may be shaped to form a nail, a loop, or the like.

It will further be seen we have herein provided a fastener which can be pre-formed at the point of manufacture, or the fastener can be manually formed at the point of installation, depending on engineering and user choice.

Still a further object of the present invention is to provide a fastener which requires very little time to install.

Furthermore, it will now be seen we have provided a fastener which allows the user to fine tune the height of the fastener and the object being supported therefrom. For example, after the fastener has been installed and the legs are twisted around each other forming an opening, and the object positioned therein, the workman can easily insert a tool into the opening and either twist the tool clockwise or counter clockwise, until the desired height is achieved.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

We claimed:

1. A multipurpose support device comprising: an elongated member which is substantially folded over at least once lengthwise, thus forming substantially a looped end; a first integral leg having a first end, a first section and a second section; and a second integral leg having a first end, a first section and a second section; each said leg being substantially aligned side-by-side, said second section of said first leg being bent to form substantially a first circle, said second section of said second leg being bent to form substantially a second circle, each said circle being substantially aligned side-by-side, said first section of said first leg extending upwardly from said first circle, said first section of said second leg extending upwardly from said second circle, and said looped end being of a shape to be removably attached at a location of choice to each said first section simultaneously, said first end of said first leg being removably attachable to a support structure, said first end of said second leg being removably attachable to said support structure, whereby:
   when an object is inserted within each said circle, and said looped end is adjustably attached, said object is held and supported in a secure manner and wherein said loop end is bendable into the position of choice on the first section of each said leg.

2. The invention claimed is a multipurpose support device comprising: an elongated member which is substantially folded over at least once lengthwise, thus forming substantially a looped end; a first integral leg having a first end, a first section and a second section; and a second integral leg having a first end, a first section and a second section; each said leg being substantially aligned side-by-side, said second section of said first leg being bent to form substantially a first circle, said second section of said second leg being bent to form substantially a second circle, each said circle being substantially aligned side-by-side, said first section of said first leg extending upwardly from said first circle, said first section of said second leg extending upwardly from said second circle, and said looped end being of a shape to be removably attached at a location of choice to each said first section simultaneously, said first end of said first leg being removably attachable to a support structure, said first end of said second leg being removably attachable to said support structure, said looped end is removably attached to a tag, and said tag providing substantially a grippable handle which allows a user to grip said tag and bend said looped end into substantially a position of choice, whereby:
   when an object is inserted within each said circle, and said looped end is adjustably attached, said object is held and supported in a secure manner.

3. The device of claim 2 wherein each said first section are substantially twisted in a manner which forms substantially an opening, said opening being of a shape and size to slidably receive a tool there through, whereby:
   when said tool is inserted into said opening and manually rotated, each said first section is urged in either an upward or downward direction,
   whereby:
   the length of each said leg is adjustable.

4. The device of claim 2 wherein said tag is color coded and represents pertinent information relating to said device.

5. The device of claim 2 further includes indicia substantially positioned on at least one of said legs at a position of choice.

6. The device of claim 5 wherein said indicia is measurements.

7. A multipurpose support device comprising: an elongated member which is substantially folded over at least once lengthwise, thus forming substantially a looped end; a first integral leg having a first end, a first section and a second section; and a second integral leg having a first end, a first section and a second section; each said leg being substantially aligned side-by-side, said second section of said first leg being bent to form substantially a first circle, said second section of said second leg being bent to form substantially a second circle, each said circle being substantially aligned side-by-side, said first section of said first leg extending upwardly from said first circle, said first section of said second leg extending upwardly from said second circle, and said looped end being of a shape to be removably attached at a location of choice to each said first section simultaneously, said first end of said first leg being removably attachable to a first support structure, said first end of said second leg being removably attachable to a second support structure, whereby;
   when an object is inserted within each said circle, and said looped end is adjustably attached, said object is held and supported in a secure manner and wherein said loop end is bendable into the position of choice on the first section of each said leg.

8. A multipurpose support device comprising: an elongated member which is substantially folded over at least once lengthwise, thus forming substantially a looped end; a first integral leg having a first end, a first section and a second section; and a second integral leg having a first end, a first section and a second section; each said leg being substantially aligned side-by-side, said second section of said first leg being slidably engaged within a first elongated insulating member, said second section of said second leg being slidably engaged within a second elongated insulating member, said looped end being exposed, said second section of said first leg and said first insulating member being bent to form substantially a first circle, said second section of said second leg and said second insulating member being bent to form substantially a second circle, each said circle being substantially aligned side-by-side, said first section of said first leg extending upwardly from said first circle, said first section of said second leg extending upwardly from said second circle, and said looped end being of a shape to be removably attached at a location of choice to each said first section simultaneously, said first end of said first leg being removably attachable to a support structure, said first end of said second leg being removably attachable to said support structure, said support structure is of a shape and size to substantially support thereon at least two support devices simultaneously, with each of said support devices cooperating together and being located at a position of choice, whereby:

when an object is inserted within each said circle, and said looped end is adjustably attached, said object is held and supported in a secure manner.

9. A multipurpose support device comprising: an elongated member which is substantially folded over once lengthwise, thus forming substantially a looped end; a first integral leg having a first end, a first section and a second section; and a second integral leg having a second end, a first section and a second section; each said leg being substantially aligned side-by-side, said second section of said first leg being slidably engaged within a first elongated insulating member, said second section of said second leg being slidably engaged within a second elongated insulating member, said looped end being exposed, said second section of said first leg and said first insulating member being bent to form substantially a first circle, said second section of said second leg and said second insulating member being bent to form substantially a second circle, each said circle being substantially aligned side-by-side, said first section of said first leg extending upwardly from said first circle, said first section of said second leg extending upwardly from said second circle, and said looped end being of a shape to be removably attached at a location of choice to each said first section simultaneously, said first end being removably attachable to a first support structure, said second end being removably attachable to a second support structure, whereby:

when an object is inserted within each said circle, and said looped end is adjustably attached, said object is held and supported in a secure manner and wherein said loop end is bendable into the position of choice on the first section of each said leg.

10. The invention claimed is a multipurpose support device comprising: an elongated member which is substantially folded over once lengthwise, thus forming substantially a looped end; a first integral leg having a first end, a first section and a second section; and a second integral leg having a second end, a first section and a second section; each said leg being substantially aligned side-by-side, said second section of said first leg being slidably engaged within an elongated insulating member, said second section of said second leg being slidably engaged within said elongated insulating member, said looped end being exposed, each said second section and said insulating member being bent to form substantially a circle, each said section being substantially aligned side-by-side, said first section of said first leg extending upwardly from said circle, said first section of said second leg extending upwardly from said circle, and said looped end being of a shape to be removably attached at a location of choice to each said first section simultaneously, said first end being removably attachable to a support structure, said second end being removably attachable to said support structure, whereby:

when an object is inserted within said circle and said looped end is adjustably attached, said object is held and supported in a secure manner.

11. A method of installing a multipurpose support device, said device comprising: an elongated member which is substantially folded over once lengthwise, thus forming substantially a looped end; a first integral leg having a first end, a first section and a second section; and a second integral leg having a second end, a first section and a second section; each said leg being substantially aligned side-by-side, said second section of said first leg being bent to form substantially a first circle, said second section of said second leg being bent to form substantially a second circle, each said circle being substantially aligned side-by-side, said first section of said first leg extending upwardly from said first circle, said first section of said second leg extending upwardly from said second circle, and said looped end being of a shape to be removably attached at a location of choice to each said first section simultaneously and wherein said loop end is bendable into the position of choice on the first section of each said leg, said method comprising the following steps of:

a. determining the desired location for the object to be supported;

b. attaching said first end to said support structure;

c. attaching said second end to said support structure;

d. positioning said object to be supported within said first and said second circle; and e. attaching said looped end at a location of choice on each said first section simultaneously.

* * * * *